US011418360B2

(12) United States Patent
Jones et al.

(10) Patent No.: US 11,418,360 B2
(45) Date of Patent: Aug. 16, 2022

(54) USING LATENT DIAGNOSTIC CAPABILITIES FOR ADDITIONAL CAN BUS MONITORING

(71) Applicant: Deere & Company, Moline, IL (US)

(72) Inventors: Amy K. Jones, Ashbury, IA (US); Christopher R. Edwards, Dubuque, IA (US); Daniel M. Kassen, Hazel Green, WI (US)

(73) Assignee: Deere & Company, Moline, IL (US)

( * ) Notice: Subject to any disclaimer, the term of this patent is extended or adjusted under 35 U.S.C. 154(b) by 420 days.

(21) Appl. No.: 16/666,866

(22) Filed: Oct. 29, 2019

(65) Prior Publication Data

US 2021/0126928 A1    Apr. 29, 2021

(51) Int. Cl.
*B60R 16/023*    (2006.01)
*G05B 19/042*    (2006.01)
(Continued)

(52) U.S. Cl.
CPC ...... *H04L 12/40013* (2013.01); *B60R 16/023* (2013.01); *G05B 19/042* (2013.01);
(Continued)

(58) Field of Classification Search
CPC ............ A01B 76/00; B60R 16/005–08; G05B 19/02–46; G05B 21/02; G05B 23/02–0297; G05B 2219/10; G05B 2219/11; G05B 2219/1136; G05B 2219/20; G05B 2219/24; G05B 2219/24065; G05B 2219/25; G05B 2219/25003; G05B 2219/25031; G05B 2219/25032; G05B 2219/25331; G05B 2219/30; G05B 2219/31; G05B 2219/31108;
(Continued)

(56) References Cited

U.S. PATENT DOCUMENTS

| 6,467,039 B1 | 10/2002 | Fredriksson | |
|---|---|---|---|
| 2016/0335073 A1* | 11/2016 | Hong | H04L 67/12 |
| 2017/0171051 A1* | 6/2017 | Joo | H04L 12/403 |

FOREIGN PATENT DOCUMENTS

| CN | 102318269 A | * | 1/2012 | ....... H04L 12/40032 |
|---|---|---|---|---|
| CN | 109960177 A | * | 7/2019 | ....... H04L 12/40032 |
| DE | 69736278 T2 | | 6/2007 | |

* cited by examiner

*Primary Examiner* — Timothy J Weidner
(74) *Attorney, Agent, or Firm* — Tucker Ellis LLP

(57) ABSTRACT

Systems and methods are provided for enhancing diagnosis of control logic by automatically triggering latent or quiescent diagnostic logic in response to a CAN bus signal and without requiring a software update of the control logic. The diagnostic logic may be triggered to provide an increase in the frequency of CAN messages that are generated. The diagnostic logic may be further triggered to provide a generation of additional CAN messages reporting operation signals beyond those that are normally generated. The diagnostic logic may be further triggered to provide higher priority to selected CAN messages reporting operation signals. The diagnostic logic may be still further triggered to one or more of increase the frequency of selected CAN report messages, generate additional CAN messages reporting operation signals beyond those that are normally generated, and/or provide higher priority to selected CAN messages reporting operation signals, each without requiring a software update.

16 Claims, 9 Drawing Sheets

(51) Int. Cl.
  *G05B 23/02*   (2006.01)
  *H04L 9/40*    (2022.01)
  *H04L 12/40*   (2006.01)
  *H04L 67/12*   (2022.01)
  *H04L 69/00*   (2022.01)

(52) U.S. Cl.
  CPC ..... *G05B 23/0216* (2013.01); *G05B 23/0221* (2013.01); *H04L 12/4013* (2013.01); *H04L 12/40032* (2013.01); *H04L 12/40143* (2013.01); *H04L 63/1416* (2013.01); *H04L 67/12* (2013.01); *H04L 69/26* (2013.01); *G05B 2219/1136* (2013.01); *G05B 2219/24065* (2013.01); *G05B 2219/25032* (2013.01); *G05B 2219/25331* (2013.01); *H04L 2012/40215* (2013.01); *H04L 2012/40273* (2013.01)

(58) Field of Classification Search
  CPC ........... G05B 2219/31109; G05B 2219/31111; G05B 2219/31128; G05B 2219/31136; G05B 2219/31142; G05B 2219/31143; H04L 12/40–417; H04L 2012/40208–40293; H04L 63/14–1491; H04L 67/12–125; H04L 69/26–28; H04W 4/30–48
  See application file for complete search history.

| SIGNAL | RATE | MESSAGE PRIORITY |
|---|---|---|
| Fan Speed | 1000 ms | 2 |
| Fan Pump Command | 20 ms | 3 |
| Fan State | 20 ms | 4 |

FIGURE 4a

| SIGNAL | RATE | MESSAGE PRIORITY |
|---|---|---|
| Fan Speed | 20 ms | 2 |
| Fan Pump Command | 20 ms | 3 |
| Fan State | 20 ms | 4 |

FIGURE 4b

| SIGNAL | RATE | MESSAGE PRIORITY |
|---|---|---|
| Fan Speed | 1000 ms | 2 |
| Fan Pump Command | 20 ms | 3 |
| Fan State | 20 ms | 4 |

FIGURE 5a

| SIGNAL | RATE | MESSAGE PRIORITY |
|---|---|---|
| Fan Speed | 1000 ms | 2 |
| Fan Pump Command | 20 ms | 3 |
| Fan State | 20 ms | 4 |
| Commanded Fan Speed | 1000 ms | 1 |

FIGURE 5b

| SIGNAL | RATE | MESSAGE PRIORITY |
|---|---|---|
| Fan Speed | 1000 ms | 2 |
| Fan Pump Command | 20 ms | 3 |
| Fan State | 20 ms | 4 |

FIGURE 6a

| SIGNAL | RATE | MESSAGE PRIORITY |
|---|---|---|
| Fan Speed | 1000 ms | 0 |
| Fan Pump Command | 20 ms | 3 |
| Fan State | 20 ms | 4 |

FIGURE 6b

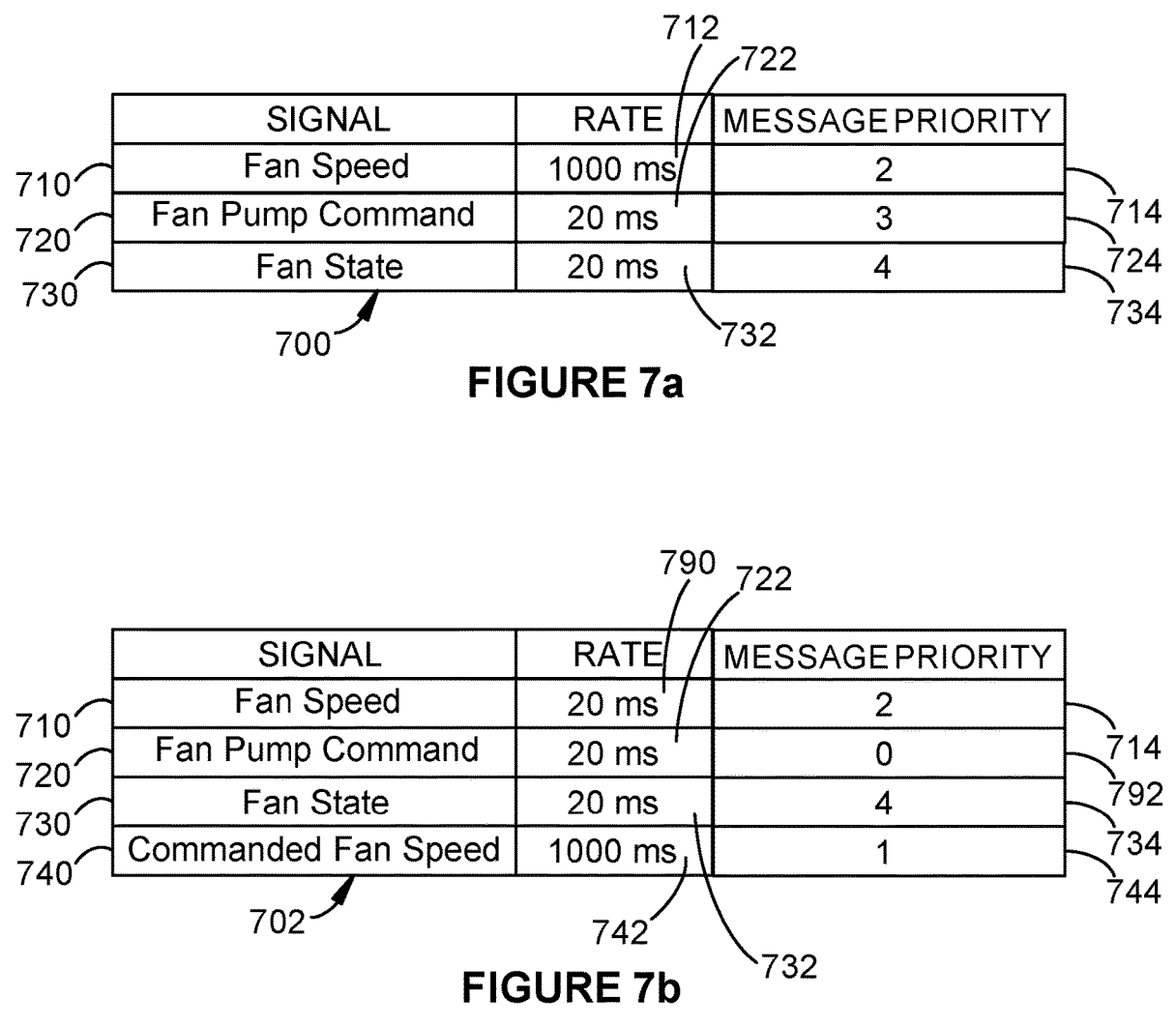

| SIGNAL | RATE | MESSAGE PRIORITY |
|---|---|---|
| Fan Speed | 1000 ms | 2 |
| Fan Pump Command | 20 ms | 3 |
| Fan State | 20 ms | 4 |

FIGURE 7a

| SIGNAL | RATE | MESSAGE PRIORITY |
|---|---|---|
| Fan Speed | 20 ms | 2 |
| Fan Pump Command | 20 ms | 0 |
| Fan State | 20 ms | 4 |
| Commanded Fan Speed | 1000 ms | 1 |

FIGURE 7b

USING LATENT DIAGNOSTIC CAPABILITIES FOR ADDITIONAL CAN BUS MONITORING

FIELD OF THE DISCLOSURE

The embodiments herein relate generally to messages on a Controller Area Network (CAN) bus that may be used to monitor the activities of CAN devices on the CAN bus controlling operations of an associate work vehicle, more particularly, to systems and methods for controlling the CAN devices generating the CAN messages to selectively render additional information during certain desired periods for enhanced CAN bus monitoring without adversely affecting message loading on the CAN bus outside of the certain desired periods. Although the embodiments will be described with reference to construction vehicles and particular operations thereof, it is to be appreciated that the claimed embodiments are also amenable to other applications and operating conditions, and can be equivalently extended to other embodiments and environments such as for example in farming or industrial vehicles and to other applications or anywhere there is a need to perform enhanced CAN bus monitoring without adversely affecting message loading on the CAN bus during normal operation of the vehicle.

BACKGROUND

Modern construction vehicles, agricultural tractors, and many other similar work vehicles use individual controllers disposed at or near to the various operations that are performed by the work vehicle. Examples of operations include a hydraulic pump operation and an operator's cab interface operation, for example. The controllers are typically arranged in a communication and control network and each of the individual controllers may communicate with other controllers via a bus of the network for exchanging control commands, performance data, and the like. One factor to be considered, however, when providing communication systems such as for example the CAN networks, is the load on the communication network. For most construction and farming machines, this is the CAN bus load. The number of messages that are transmitted, the priorities assigned to the messages, and the frequencies at which they are transmitted are some of the largest contributors to a high CAN bus load. At the same time, CAN logs are highly desirable for use in troubleshooting these networks, and having more information transmitted via CAN makes the data used for the diagnostics easy to collect and helps to speed up the troubleshooting process. This leads to a fundamental contradiction, wherein design teams often want more information presented onto the CAN bus for purposes of data logging or troubleshooting than may be normally be tolerable for basic machine performance.

Normally, changing the priority, number, or frequency of CAN messages on the bus requires a new software version to be loaded on the machine. However, changing these parameters of CAN messages to be communicated onto the CAN bus by means of loading a new software version onto the machine for performing the diagnostics isn't desirable since it is usually time intensive and also because it can result in a difference between the original software demonstrating the issue that is the target of the diagnostic inquiry and the software being used to log it.

It is therefore desirable to provide systems and methods of automatically triggering a change in priority in selected ones of the CAN messages that are generated so that CAN messages communicating data relating to signals of interest for diagnostics may have an increased preference on the CAN bus without requiring a software update.

It is therefore also desirable to provide systems and methods of automatically triggering an increase in the frequency of the CAN messages that are generated so that CAN messages communicating data relating to signals of interest for diagnostics may provide more detailed time wise information by the increased frequency of reporting without requiring a software update.

It is therefore still further desirable to provide systems and methods of automatically triggering the generation of additional CAN messages beyond those that are normally generated so that new CAN messages communicating data relating to additional signals of interest for diagnostics may be generated without requiring a software update.

It is therefore further desirable to provide systems and methods of automatically triggering a change in priority in selected ones of the CAN messages that are generated, and of automatically triggering an increase in the frequency of the CAN messages that are generated.

It is therefore yet still further desirable to provide systems and methods of automatically triggering a change in priority in selected ones of the CAN messages that are generated, and of automatically triggering the generation of additional CAN messages beyond those that are normally generated.

It is therefore still further yet desirable to provide systems and methods of both automatically triggering an increase in the frequency of the CAN messages that are generated, and of automatically triggering the generation of additional CAN messages beyond those that are normally generated.

It is therefore further desirable to provide systems and methods of automatically triggering a change in priority in selected ones of the CAN messages that are generated, and of automatically triggering an increase in the frequency of the CAN messages that are generated, and of automatically triggering the generation of additional CAN messages beyond those that are normally generated.

SUMMARY

The embodiments herein provide for new and improved systems and methods for systems and methods of automatically triggering an increase in the frequency of the CAN messages that may be generated for providing enhanced diagnosis.

The embodiments herein provide for new and improved systems and methods for automatically triggering a change in priority in selected ones of the CAN messages that are generated so that CAN messages communicating data relating to signals of interest for diagnostics may have an increased preference on the CAN bus without requiring a software update.

The embodiments herein provide for new and improved systems and methods for automatically triggering an increase in the frequency of the CAN messages that are generated so that CAN messages communicating data relating to signals of interest for diagnostics may provide more detailed time wise information by the increased frequency of reporting without requiring a software update.

The embodiments herein provide for new and improved systems and methods for automatically triggering the generation of additional CAN messages beyond those that are normally generated so that new CAN messages communicating data relating to additional signals of interest for diagnostics may be generated without requiring a software update.

The embodiments herein provide for new and improved systems and methods for both automatically triggering a change in priority in selected ones of the CAN messages that are generated, and for automatically triggering an increase in the frequency of the CAN messages that are generated.

The embodiments herein provide for new and improved systems and methods for both automatically triggering a change in priority in selected ones of the CAN messages that are generated, and for automatically triggering the generation of additional CAN messages beyond those that are normally generated.

The embodiments herein provide for new and improved systems and methods for both automatically triggering an increase in the frequency of the CAN messages that are generated, and for automatically triggering the generation of additional CAN messages beyond those that are normally generated.

The embodiments herein provide for new and improved systems and methods for automatically triggering a change in priority in selected ones of the CAN messages that are generated, and for automatically triggering an increase in the frequency of the CAN messages that are generated, and for automatically triggering the generation of additional CAN messages beyond those that are normally generated.

In accordance an aspect, a system provides enhanced diagnostic monitoring of operations of an associated work vehicle. The system includes a Controller Area Network (CAN) bus, and a first CAN device controlling a first operation of the associated work vehicle. The first CAN device includes a first processor, a first CAN transceiver operatively coupling the first processor with the CAN bus, a first memory device, first operation control logic stored in the first memory device, and first operation diagnostic reporting logic stored in the first memory device. The first operation control logic is executable by the first processor to control the first operation of the associated work vehicle based on a first operation command message received by the first CAN device from the CAN bus via the first CAN transceiver. The first operation status reporting logic is executable by the first processor to determine at a first time rate values of a first operational signal of the first operation, generate first signal first operation status CAN messages comprising first operation data representative of the values of the first operational signal of the first operation determined at the first time rate, and transmit the first signal first operation status CAN messages via the first CAN transceiver to the CAN bus at the first time rate. The first operation diagnostic reporting logic is selectively executable by the first processor in response to the first CAN device receiving a first enhanced diagnostics command message from the CAN bus to one or more of determine, at a second time rate greater than the first time rate, values of the first operational signal of the first operation; generate first signal first operation enhanced status CAN messages comprising first signal first operation enhanced data representative of the values of the first operational signal of the first operation determined at the second time rate; and transmit the first signal first operation enhanced status CAN messages via the first CAN transceiver to the CAN bus at the second time rate in lieu of transmitting the first signal first operation status CAN messages via the first CAN transceiver to the CAN bus at the first time rate.

The first operation diagnostic reporting logic is further operable to determine values of a second operational signal of the first operation different than the first operational signal of the first operation, generate second signal first operation status CAN messages having a specified message priority and comprising second signal first operation data representative of the determined values of the second operational signal of the first operation, and transmit the second signal first operation status CAN messages via the first CAN transceiver to the CAN bus.

The first operation diagnostic reporting logic is still further operable to determine, at the first time rate, the values of the first operational signal of the first operation, generate first signal first operation status prioritized CAN messages having a second message priority higher than the first message priority and comprising the first signal first operation data representative of the values of the first operational signal of the first operation determined at the first time rate, and transmit the first signal first operation status prioritized CAN messages to the CAN bus at the first time rate in lieu of transmitting the first signal first operation status CAN messages to the CAN bus at the first time rate.

Other embodiments, features and advantages of the example embodiments for automatically triggering additional CAN messages and/or increasing the frequency of the CAN messages without requiring a software update will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIGS. 4a and 4b show tables illustrating examples of operation signals that may be monitored by CAN devices in the CAN networks of FIGS. 1 and 2 and that may be adapted to increase CAN message frequency of one or more of the monitored operation signals in accordance with an example embodiment.

FIGS. 5a and 5b show tables illustrating examples of operation signals that may be monitored by CAN devices in the CAN networks of FIGS. 1 and 2 and that may be adapted to add new CAN messages for monitoring additional one or more of the monitored operation signals in accordance with an example embodiment.

FIGS. 6a and 6b show tables illustrating examples of operation signals that may be monitored by CAN devices in the CAN networks of FIGS. 1 and 2 and that may be adapted to change priority of one or more of the CAN messages so that CAN messages communicating data relating to signals of interest for diagnostics may have an increased preference on the CAN bus in accordance with an example embodiment.

FIGS. 7a and 7b show tables illustrating examples of operation signals that may be monitored by CAN devices in the CAN networks of FIGS. 1 and 2 and that may be adapted to increase CAN message frequency of one or more of the monitored operation signals, and to add new CAN messages for monitoring additional one or more of the monitored operation signals, and to change priority of one or more of the CAN messages in accordance with an example embodiment.

DETAILED DESCRIPTION

In the following description reference is made to the accompanying figures which form a part thereof, and in which is shown, by way of illustration, one or more example embodiments of the disclosed system and method for using latent diagnostic capabilities in one or more nodes of a CAN network for selectively providing additional CAN bus monitoring. Various modifications of the example embodiments may be contemplated by on of skill in the art.

Figure 1:
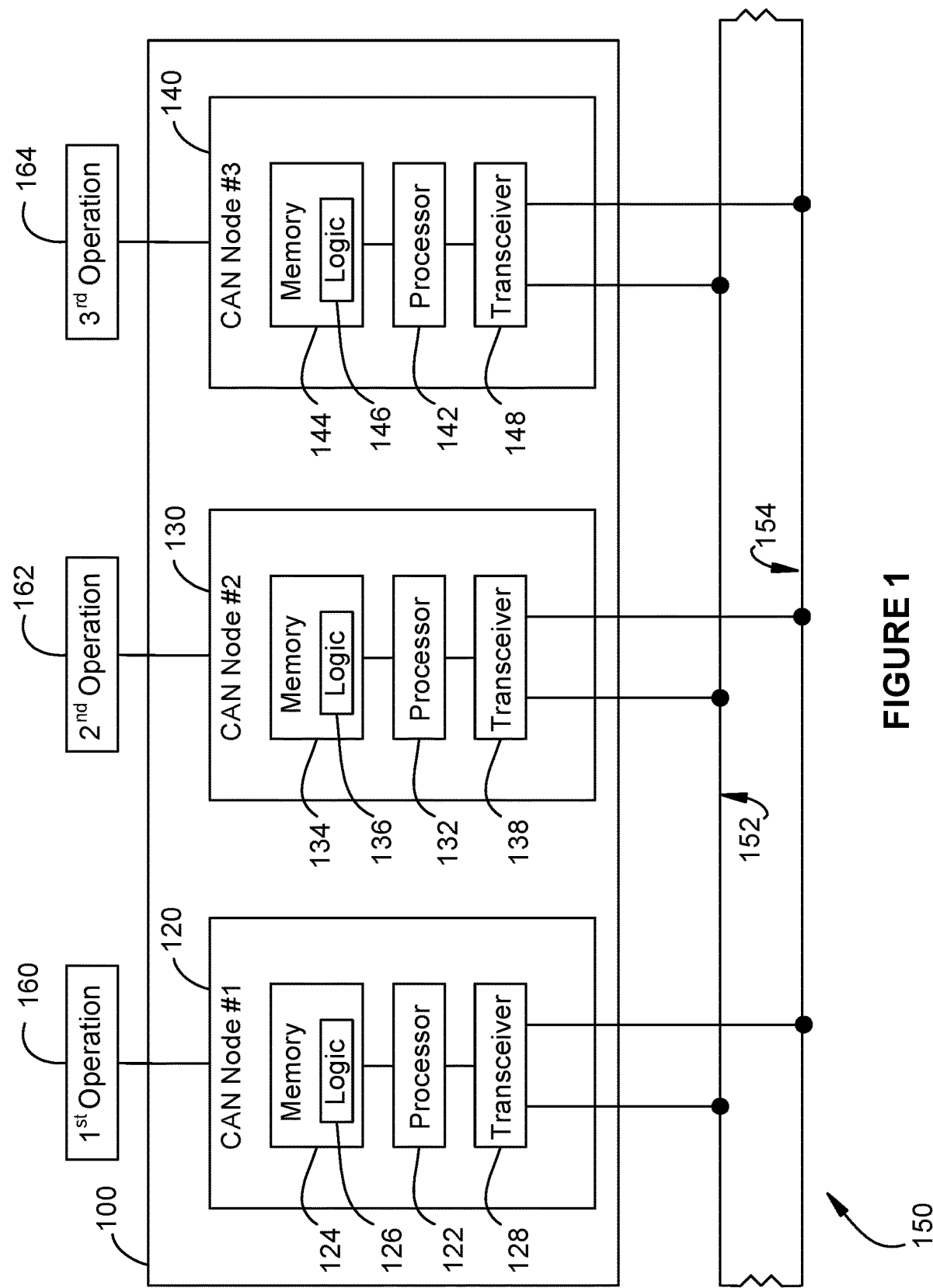
FIG. 1 depicts a CAN network that includes multiple CAN nodes mutually connected with a CAN bus.

Referring now to the drawings, wherein the showings are only for the purpose of illustrating the example embodiments only and not for purposes of limiting the same, FIG. 1 is a simplified depiction of Controller Area Network (CAN) 100 that includes multiple CAN nodes 120, 130, 140 in accordance with an example embodiment. The CAN nodes may also be referred to herein as Electronic Control Units (ECUs), CAN devices, CAN controllers, or the like. Each of the CAN nodes 120, 130, 140 is connected with a CAN bus 150. In addition, each of the CAN nodes includes a processor, a memory, device, and a transceiver. In the example illustrated, the first CAN node 120 includes a first processor 122 operatively coupled with a first memory device 124 which may store logic 126 that is executable by the processor and data for use by the processor while executing the logic to carry out one or more particular function(s) and/or protocol(s) for effecting control over a first operation 160 of an associated work vehicle, device, apparatus, machine or the like in which the CAN network 100 is disposed. The logic 126 may include operation control logic that is executable by the first processor 122 to control the first operation 160 of the associated work vehicle based on a first operation command message received by the first CAN device 120 from the CAN bus 150 via the first CAN transceiver 128. The logic 126 may further include operation status reporting logic that is executable by the first processor 122 to determine at a selected time rate values of one or more operational signals of the first operation 160, generate first operation status CAN messages comprising first operation data representative of the values of the one or more operational signals of the first operation 160 determined at the selected time rate, and transmit the first operation status CAN messages via the first CAN transceiver 128 to the CAN bus 150 at the selected time rate.

In the example embodiments described in the present disclosure, the CAN network 100 may be disposed in a large off-road work vehicle such as an excavator, for example. The first CAN node 120 may control a cooling fan in the excavator as the first operation for example. The first CAN node 120 in the example show in in FIG. 1 includes a first transceiver device 128 disposed between the first processor 122 and the CAN bus 150 for implementing a physical layer connection between the first processor 122 and the CAN bus 150.

Also in the example illustrated, the second CAN node 130 includes a second processor 132 operatively coupled with a second memory device 134 which may store logic that is executable by the second processor and data for use by the second processor while executing the logic to carry out one or more particular function(s) and/or protocol(s) for effecting control over a further operation 162 of the associated work vehicle such as an excavator, for example, and the second CAN node 130 may control a main hydraulic pump of the excavator as a second operation 162 for example. The second CAN node 130 in the example show also includes a second transceiver device 138 disposed between the second processor 132 and the CAN bus 150 for implementing a physical layer connection between the second processor 132 and the CAN bus 150.

Similar to the first CAN device 120, the logic 136 of the second CAN device 130 may include operation control logic that is executable by the second processor 132 to control the second operation 162 of the associated work vehicle based on a second operation command message received by the second CAN device 130 from the CAN bus 150 via the second CAN transceiver 138. The logic 136 may further include operation status reporting logic that is executable by the second processor 132 to determine at a selected time rate values of one or more operational signals of the second operation 162, generate second operation status CAN messages comprising second operation data representative of the values of the one or more operational signals of the second operation 162 determined at the selected time rate, and transmit the second operation status CAN messages via the second CAN transceiver 138 to the CAN bus 150 at the selected time rate.

Yet further in the example illustrated, the third CAN node 140 includes a third processor 142 operatively coupled with a third memory device 144 which may store logic that is executable by the third processor and data for use by the third processor while executing the logic to carry out one or more particular function(s) and/or protocol(s) for effecting control over yet a further operation 164 of the associated work vehicle such as an excavator, for example, and the third CAN node 140 may control an operator's display unit disposed in a cab of the excavator as the third operation for example. The third CAN node 140 in the example show also includes a third transceiver device 148 disposed between the third processor 142 and the CAN bus 150 for implementing a physical layer connection between the third processor 142 and the CAN bus 150.

Similar to the first and second CAN devices 120, 130, the logic 146 of the third CAN device 140 may include operation control logic that is executable by the third processor 142 to control the third operation 164 of the associated work vehicle based on a third operation command message received by the third CAN device 140 from the CAN bus 150 via the third CAN transceiver 148. The logic 146 may further include operation status reporting logic that is executable by the third processor 142 to determine at a selected time rate values of one or more operational signals of the third operation 164, generate third operation status CAN messages comprising third operation data representative of the values of the one or more operational signals of the third operation 164 determined at the selected time rate, and transmit the third operation status CAN messages via the third CAN transceiver 148 to the CAN bus 150 at the selected time rate.

It is to be appreciated that the processors 122, 132, 142 may be any form of controller, micro-controller or the like, and that the CAN nodes 120, 130, 140 are typically connected with at least one other device (not shown) such as, for example, one or more sensor(s), one or more actuator(s), or some other control device. In addition and in accordance with the descriptions herein, the term "computer-readable medium" as may be used herein refers to any non-transitory media that participates in providing instructions to the processors 122, 132, 142 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The can bus 150 illustrated in FIG. 1 carries analog differential signals and includes a CAN high (CANH) bus line 152 and a CAN low (CANL) bus line 154. The CAN bus 150 is known in the art.

Figure 2:
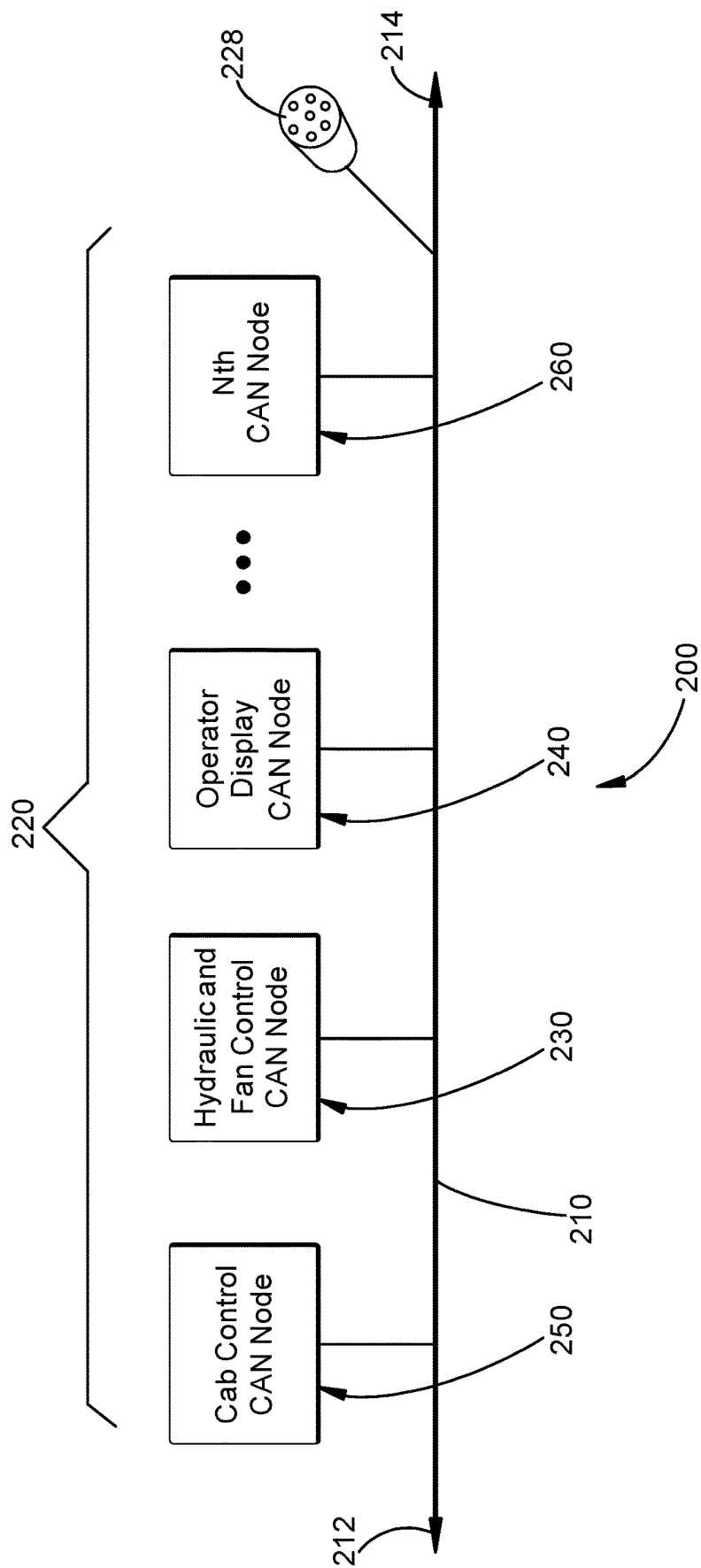
FIG. 2 depicts a CAN network applied in an associated work vehicle in accordance with an example embodiment that includes a CAN bus connecting multiple CAN devices controlling various operations of the associated work vehicle.

FIG. 2 depicts a CAN network 200 applied in an associated work vehicle such as for example in an excavator work vehicle in accordance with an example embodiment that includes a CAN bus 210 connecting multiple CAN devices 220 each including a transceiver for coupling the CAN device with the CAN bus 210, a processor, and a memory storing logic that is executable by the processor for controlling various operations of the associated work vehicle. The CAN bus 210 has first and second plugs 212, 214 for connection to further extensions of the CAN bus 210 with one or more CAN bus extensions as may be necessary or desired.

In addition, a service plug 228 is provided for connection with an associated data logger type device (not shown) for providing diagnostics of the devices 220 on the CAN bus 210. In an example embodiment the associated data logger is sensed when it is connected with the CAN bus 210 by the data logger providing a unique source address, such as 0xFA, for example. By the associated data logger providing the unique source address, such as 0xFA, for example, onto the CAN bus, each of the multiple CAN devices 220 may react in accordance with example embodiments by executing diagnostic logic that is otherwise latent in the devices 220 and not executed under normal operating conditions of the associated work vehicle. In that way, diagnostics may be performed on the CAN bus without the need to update the logic of any of the multiple CAN devices 220. Further, the diagnostics may be performed on the CAN bus without adversely affecting the normal operations of the associated vehicle owing to CAN message latency such as may be caused by the additional CAN diagnostic message traffic.

The multiple CAN devices 220 may include in the illustrated example a Hydraulic and Fan Control Unit (HFCU) 230 provided for controlling various hydraulic operations of the associated work vehicle including for example hydraulics controlling a fan of the associated work vehicle. The HFCU 230 includes logic that is executable by a processor for an output side of machine operation for power control. The HFCU 230 receives information in the form of data and commands from input signals received from an Operator Display CAN Control Unit 240 (DISP) and uses the data and commands from the DISP 240 to control pumps and the like. The DISP 240 may be used to receive signals from an operator for controlling an Engine Control Unit (ECU) or the like as may be necessary or desired. The DISP 240 is provided in the operator's cab of the associated work vehicle and includes logic that is executable by a processor for providing a visual monitor that may be used by the operator while operating the work vehicle from within its cab.

The multiple CAN devices 220 may further include in the illustrated example a Cab Control Controller Unit (CAB) 250 for controlling operations of the various functions within an operators cab of the associated work vehicle. The CAB 250 is provided in the operator's cab of the associated work vehicle and includes logic that is executable by a processor for interfacing the human operator with the majority of the operator inputs or functions inside of an operator station of the work vehicle. The operator inputs may include joysticks, lights, annunciators, and the like. The multiple CAN devices 220 may further include in the illustrated example one or more Auxiliary Control Unit (XCU) 260 used for machine options that require additional inputs/outputs.

Figure 3:
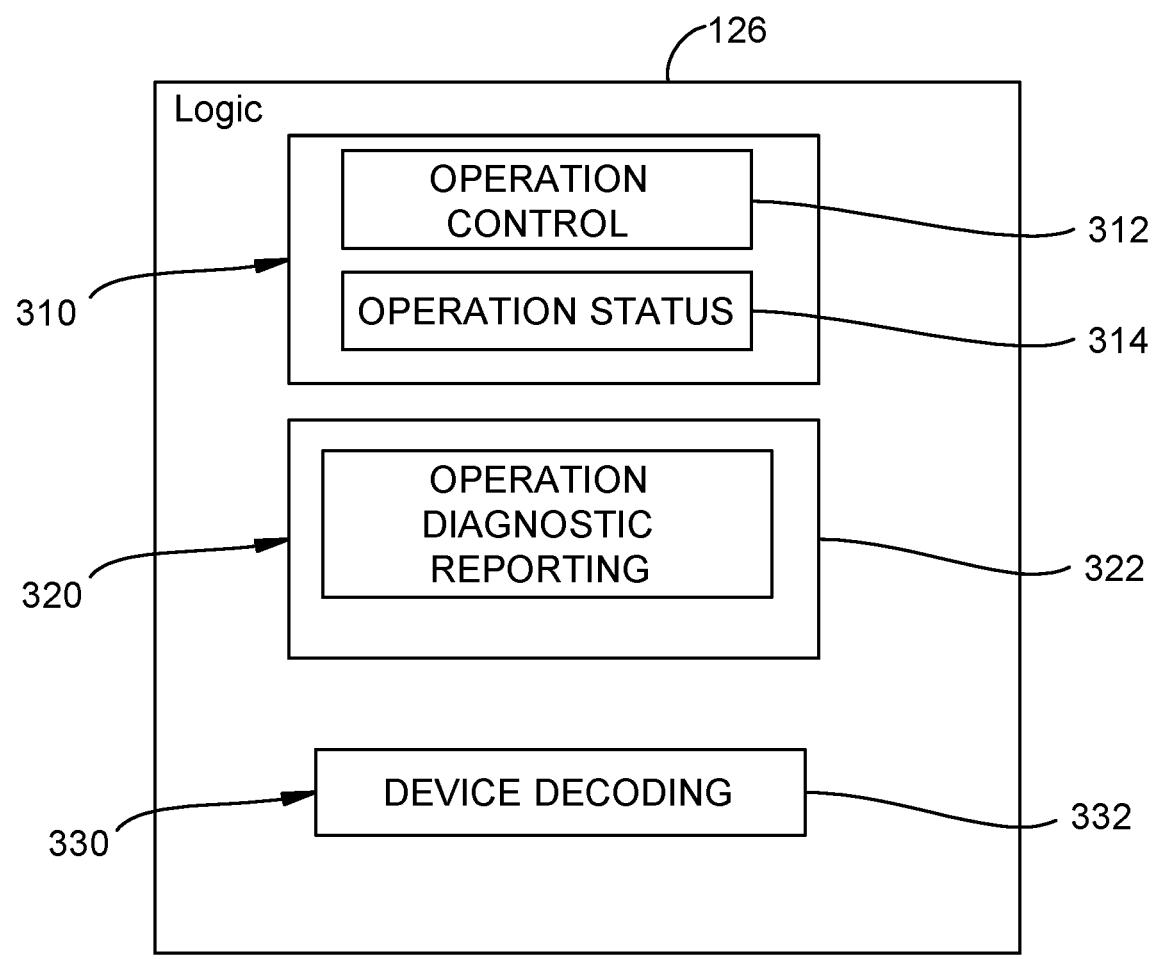
FIG. 3 is a schematic view of a representative memory of CAN devices in the CAN networks of FIGS. 1 and 2.

FIG. 3 shows in diagrammatic form the logic 126 stored in the first memory device 124 of the first Can node 120 of the example embodiment show in FIG. 1. It is to be appreciated that the logic 126 shown in FIG. 3 is representative not only of the logic 126 stored in the first memory device 124 of the first Can node 120 of the example embodiment show in FIG. 1, but also of the logic stored in memory devices of the other CAN nodes 130, 140 of FIG. 1 and also of the logic stored in memory devices of any one or more of the CAN controllers 220, and 230-260 of the example embodiment shown in FIG. 2. Therefore, the descriptions of the logic 126 shown in FIG. 3 may apply equally to the logic of any of the CAN controllers of any of the example embodiments. As described, the logic 126 is executable by the first processor 122 to control the first operation 160 of the associated work vehicle and to generate CAN messages for reporting operational signals of the various operations to other CAN controllers in the CAN network 100, and for use in logging the signals for accounting, diagnostic, and other purposes. One factor to be considered, however, when providing communication systems such as for example the CAN networks 100, 200 of the example embodiments, is the load on the communication network. For most construction and farming machines, this is the CAN bus load. The number of messages transmitted, their priority, and the frequency at which they are transmitted are large contributors to a high CAN bus load. At the same time, CAN logs are highly desirable for use in troubleshooting the networks, and having more information transmitted via CAN makes it easy to collect and speeds up the troubleshooting process. This leads to a fundamental contradiction, where the design team wants more information on the CAN bus for purposes of data logging or troubleshooting than may be normally needed or desired for basic machine performance.

Since changing the priority and number and/or frequency of CAN messages communicated onto the CAN bus by means of loading a new software version onto the machine isn't desirable as it is time intensive and can cause a difference between the software demonstrating the issue that is the target of the diagnostic inquiry and the software used to log it, the example embodiments disclosed herein provide systems and methods of automatically triggering an increase in the frequency of the CAN messages that are generated so that CAN messages communicating data relating to signals of interest for diagnostics may provide more detailed time wise information by the increased frequency of reporting without requiring a software update. The example embodiments disclosed herein further provide systems and methods of automatically triggering the generation of additional CAN messages beyond those that are normally generated so that new CAN messages communicating data relating to additional signals of interest for diagnostics may be generated without requiring a software update. The example embodiments disclosed herein further provide systems and methods of automatically changing the priority of the CAN messages so that CAN messages communicating data relating to signals of interest for diagnostics may have an increased preference on the CAN bus without requiring a software update.

The example embodiments disclosed herein still further provide systems and methods of both automatically triggering an increase in the frequency of the CAN messages that are generated, and automatically triggering the generation of additional CAN messages beyond those that are normally generated.

The example embodiments disclosed herein still further provide systems and methods of both automatically triggering an increase in the frequency of the CAN messages that are generated, and automatically changing the priority of the CAN messages.

The example embodiments disclosed herein still further provide systems and methods of both automatically triggering an increase in the frequency of the CAN messages that are generated, and automatically triggering the generation of additional CAN messages beyond those that are normally generated, and automatically changing the priority of the CAN messages.

The example embodiments disclosed herein still further provide systems and methods of both automatically triggering an increase in the frequency of the CAN messages that are generated, and automatically triggering the generation of additional CAN messages beyond those that are normally generated, and automatically changing the priority of the CAN messages.

In the example embodiments, the logic 126 includes an active logic portion 310 that is executable by the first processor 122 during normal operation of the CAN node 120 to control the first operation 160 of the associated work vehicle and to generate CAN messages for reporting operational signals of the various operations to other CAN controllers in the CAN network 100, and a latent logic portion 320 that is selectively executable by the first processor 122 in response to one or more trigger signals to be described in greater detail below during an enhanced diagnostic operation of the CAN node 120 to selectively provide latent enhanced diagnostic capabilities for additional CAN bus monitoring.

In the example embodiment, the operation control logic 312 of the active logic portion 310 is executable by the first processor 122 during normal operation of the CAN node 120 to control the first operation 160 such as for example a cooling fan of the associated work vehicle based on a first operation command message received by the first CAN device 120 from the CAN bus 150 via the first CAN transceiver 128. Similarly, the operation status reporting logic 314 of the active logic portion 310 is executable by the first processor 122 during normal operation of the CAN node 120 to determine at a selected time rate values of one or more operational signals such as for example reporting a fan speed of the first operation 160 once every 1000 ms and/or a fan pump command once every 20 ms to generate first operation status CAN messages comprising first operation data representative of the values of the one or more operational signals of the first operation 160 determined at the one or more selected time rates, and to transmit the first operation status CAN messages via the first CAN transceiver 128 to the CAN bus 150 at the selected time rate. The first operation status CAN messages reporting for example a first signal from the first operation and a further second signal from the first operation may be assigned a nominal priority when formed and delivered onto the CAN bus.

Further in the example embodiment, the latent logic portion 320 includes one or more logic portions including for example operation diagnostic reporting logic 322 that is selectively executable by the first processor 122 in response to one or more trigger signals during an enhanced diagnostic operation of the CAN node 120. The operation diagnostic reporting logic 322 provides an automatic increase in the frequency of the CAN messages that are generated without requiring a software update and/or an automatic triggering of the generation of additional CAN messages without requiring a software update. The operation diagnostic reporting logic 322 is selectively executable by the first processor 122 in response to the first CAN device 120 receiving a first enhanced diagnostics command message from the CAN bus 150. The operation diagnostic reporting logic 322 is selectively executable by the first processor 122 to determine at a second time rate such as once every 20 ms which is greater than the selected time rate of the active logic portion 310 of once every 1000 ms, values of the first operational signal of the first operation 160, to generate first operation enhanced status CAN messages comprising first operation enhanced data representative of the values of the first operational signal of the first operation 160 determined at the second time rate, and to transmit the first operation enhanced status CAN messages via the first CAN transceiver 128 to the CAN bus 150 at the second time rate in lieu of transmitting the first operation enhanced status CAN messages via the first CAN transceiver 128 to the CAN bus at the selected time rate of the active logic portion 310.

The operation diagnostic reporting logic 322 is further selectively executable by the first processor 122 in response to the first CAN device 120 receiving a first enhanced diagnostics command message from the CAN bus 150 to determine values of a second operational signal of the first operation 160 different than the first operational signal of the first operation 160, generate second operation status CAN messages comprising second operation data representative of the determined values of the second operational signal of the first operation 160, and transmit the second operation status CAN messages via the first CAN transceiver 128 to the CAN bus.

The operation diagnostic reporting logic 322 is further selectively executable by the first processor 122 in response to the first CAN device 120 receiving a first enhanced diagnostics command message from the CAN bus 150 to determine, at the first time rate, the values of the first operational signal of the first operation, to generate first signal first operation status prioritized CAN messages having a second message priority higher than the nominal message priority and comprising the first signal first operation data representative of the values of the first operational signal of the first operation determined at the first time rate, and transmit the first signal first operation status prioritized CAN messages to the CAN bus at the first time rate in lieu of transmitting the first signal first operation status CAN messages to the CAN bus at the first time rate.

Increased CAN Message Frequency

In an example embodiment, an increase in the frequency of the CAN messages that are generated is provided so that CAN messages communicating data relating to signals of interest for diagnostics may provide more detailed time wise information by the increased frequency of reporting without requiring a software update. With reference to the table 400 of FIG. 4a, the operation status reporting logic 314 of the active logic portion 310 is executable by a processor during a normal operation of a CAN node to determine at one or more selected time rates values of a corresponding one or more operational signals of a first operation such as for example an operation of a cooling fan of the HFCU 230 (FIG. 2), to generate first signal first operation status CAN messages having a first message priority and comprising first signal first operation data representative of the values of the one or more operational signals of the cooling fan operation determined at the one or more selected time rates, and to transmit the first signal first operation status CAN messages via a CAN transceiver to the CAN bus 150, 210 at the selected time rate. With reference to FIG. 4a, during the normal operation of the CAN node and by way of the particular example of the operation being a cooling fan of the HFCU 230 (FIG. 2), a Fan_Speed signal 410 of the cooling fan operation may be determined at a selected time rate 412 of 1000 ms and reported by CAN messages having a nominal priority of "2" 414, a Fan_Pump_Command signal 420 of the cooling fan operation may be determined at a selected time rate 422 of 20 ms and reported by CAN messages having a nominal priority of "3" 424, and a Fan_State signal 430 of the cooling fan operation may be determined at a selected time rate 432 of 20 ms and reported by CAN messages having a nominal priority of "4" 434.

With reference next to the table 402 of FIG. 4b, the operation diagnostic reporting logic 322 of the latent logic portion 320 is selectively executable by a processor in response to the CAN device 250 receiving a first enhanced diagnostics command message from the CAN bus 250. The operation diagnostic reporting logic 322 is selectively executable by the processor to determine, at a second time rate 490 greater than the originally selected time rate 412 of the active logic portion 310, one or more selected values of the operational signal of the fan speed operation, generate first signal first operation enhanced status CAN messages having the first nominal message priority 414 and comprising first signal first operation enhanced data representative of the values of the first operational signal of the first operation determined at the second time rate, and transmit the first signal first operation enhanced status CAN messages having the nominal priority of "2" 414 via the CAN transceiver to the CAN bus 250 at the second time rate. In the example embodiment, the transmitting of the first signal first operation enhanced status CAN messages via the CAN transceiver to the CAN bus 250 at the second time rate is in lieu of transmitting the first signal first operation status CAN messages via the CAN transceiver to the CAN bus 250 at the original selected time rate of the active logic portion 310. By way of the particular example of the operation being a cooling fan of the HFCU 230 (FIG. 2), the Fan_Speed signal 410 of the cooling fan operation may be determined at a second and increased time rate 490 of 20 ms and reported by CAN messages having the nominal priority of "2" 414, the Fan_Pump_Command signal 420 of the cooling fan operation may be determined at the previously selected and unchanged time rate 422 of 20 ms and reported by CAN messages having the nominal priority of "3" 424, and the Fan_State signal 430 of the cooling fan operation may be determined at the previously selected and unchanged time rate 432 of 20 ms and reported by CAN messages having the nominal priority of "3" 434.

Additional CAN Messages

In a further example embodiment, an automatic triggering of the generation of additional CAN messages is provided so that new CAN messages communicating data relating to additional signals of interest for diagnostics may be generated without requiring a software update. With reference to the table 500 of FIG. 5a, the operation status reporting logic 314 of the active logic portion 310 is executable by a processor during a normal operation of a CAN node to determine at one or more selected time rates values of a corresponding one or more operational signals of a first operation such as for example an operation of a cooling fan of the HFCU 230 (FIG. 2), to generate first signal first operation status CAN messages having a nominal message priority and comprising first operation data representative of the values of the one or more operational signals of the cooling fan operation determined at the one or more selected time rates, and to transmit the first operation status CAN messages via a CAN transceiver to the CAN bus 150, 210 at the selected time rate. With reference to FIG. 5a, during the normal operation of the CAN node and by way of the particular example of the operation being a cooling fan of the HFCU 230 (FIG. 2), a Fan_Speed signal 510 of the cooling fan operation may be determined at a selected time rate 512 of 1000 ms and reported by CAN messages having a nominal priority of "2" 514, a Fan_Pump_Command signal 520 of the cooling fan operation may be determined at a selected time rate 522 of 20 ms and reported by CAN messages having a nominal priority of "3" 524, and a Fan_State signal 530 of the cooling fan operation may be determined at a selected time rate 532 of 20 ms and reported by CAN messages having a nominal priority of "4" 534.

With reference next to the table 502 of FIG. 5b, the operation diagnostic reporting logic 322 of the latent logic portion 320 is selectively executable by a processor in response to the CAN device 250 receiving a first enhanced diagnostics command message from the CAN bus 250. The operation diagnostic reporting logic 322 is selectively executable by the processor to determine values of a second operational signal of the first operation different than the first operational signal of the first operation, generate second signal first operation status CAN messages having the nominal message priority comprising second signal first operation data representative of the determined values of the second operational signal of the first operation, and transmit the second signal first operation status CAN messages via the first CAN transceiver to the CAN bus 210. By way of the particular example of the operation being a cooling fan of the HFCU 230 (FIG. 2), the Fan_Speed signal 510 of the cooling fan operation may be determined at the previously selected time rate 512 of 1000 ms and reported by CAN messages having a nominal priority of "2" 514, the Fan_Pump_Command signal 520 of the cooling fan operation may be determined at the previously selected time rate 522 of 20 ms and reported by CAN messages having a nominal priority of "3" 524, and the Fan_State signal 530 of the cooling fan operation may be determined at the previously selected time rate 532 of 20 ms and reported by CAN messages having a nominal priority of "4" 534.

In addition, the value of a newly added Commanded_Fan_Speed signal 540 of the cooling fan operation may be determined at a selected time rate 542 of 1000 ms by the operation diagnostic reporting logic 322 being selectively executed by the processor in response to receiving the first enhanced diagnostics command message from the CAN bus 250. The determined value of the additional or newly added Commanded_Fan_Speed signal 540 of the cooling fan operation may be transmitted and reported by CAN messages having a nominal priority of "1" 544 by way of example, together with the Fan_Speed, Fan_Pump_Command, and Fan_State signals 510, 520, 530 otherwise acquired during the normal operation of the CAN node via the CAN transceiver to the CAN bus 210.

Change CAN Message Priority

In a further example embodiment, an automatic triggering of changes to CAN message priority is provided so that CAN messages communicating data relating to signals of interest for diagnostics may have an increased preference on the CAN bus without requiring a software update. With reference to the table 600 of FIG. 6a, the operation status reporting logic 314 of the active logic portion 310 is executable by a processor during a normal operation of a CAN node to determine at one or more selected time rates values of a corresponding one or more operational signals of a first operation such as for example an operation of a cooling fan of the HFCU 230 (FIG. 2), to generate first signal first operation status CAN messages having a first message priority and comprising first signal first operation data representative of the values of the one or more operational signals of the cooling fan operation determined at the one or more selected time rates, and to transmit the first signal first operation status CAN messages via a CAN transceiver to the CAN bus 150, 210 at the selected time rate. With reference to FIG. 6a, during the normal operation of the CAN node and by way of the particular example of the operation being a cooling fan of the HFCU 230 (FIG. 2), a Fan_Speed signal 610 of the cooling fan operation may be determined at a selected time rate 612 of 1000 ms and reported by CAN messages having a nominal priority of "2" 614, a Fan_Pump_Command signal 620 of the cooling fan operation may be determined at a selected time rate 622 of 20 ms and reported by CAN messages having a nominal priority of "3" 624, and a Fan_State signal 630 of the cooling fan operation may be determined at a selected time rate 632 of 20 ms and reported by CAN messages having a nominal priority of "4" 634.

With reference next to the table 602 of FIG. 6b, the operation diagnostic reporting logic 322 of the latent logic portion 320 is selectively executable by a processor in response to the CAN device 250 receiving a first enhanced diagnostics command message from the CAN bus 250. The operation diagnostic reporting logic 322 is selectively executable by the processor to determine, at the first time rate 612, the values of the first operational signal 610 of the first operation, generate first signal first operation status prioritized CAN messages having a second message priority of "0" 690 higher than the nominal first message priority of "2" 614, and comprising the first signal first operation data representative of the values of the first operational signal 610 of the first operation determined at the first time rate 612, and transmit the first signal 610 first operation status prioritized CAN messages having the modified priority "0" 690 to the CAN bus at the first time rate in lieu of transmitting the first signal first operation 610 status CAN messages to the CAN bus having the nominal priority "2" 614 at the first time rate.

In the example embodiment, the transmitting of the first signal first operation status prioritized CAN messages via the CAN transceiver to the CAN bus 250 by the operation diagnostic reporting logic 322 is in lieu of transmitting the first signal first operation status CAN messages via the CAN transceiver to the CAN bus 250 at the originally selected nominal priority of the active logic portion 310. By way of the particular example of the operation being a cooling fan of the HFCU 230 (FIG. 2), the Fan_Speed signal 610 of the cooling fan operation may be determined at the nominal time rate 612 of 1000 ms and reported by CAN messages having the increased priority of "0" 690, the Fan_Pump_Command signal 620 of the cooling fan operation may be determined at the previously selected and unchanged time rate 622 of 20 ms and reported by CAN messages having the nominal priority of "3" 624, and the Fan_State signal 630 of the cooling fan operation may be determined at the previously selected and unchanged time rate 632 of 20 ms and reported by CAN messages having the nominal priority of "3" 634.

Increased CAN Message Frequency and Additional CAN Messages and Changed Message Priority In yet a further example embodiment, an increase in the frequency of the CAN messages that are generated is provided so that CAN messages communicating data relating to signals of interest for diagnostics may provide more detailed time wise information by the increased frequency of reporting without requiring a software update. As well, an automatic triggering of the generation of additional CAN messages is provided so that new CAN messages communicating data relating to additional signals of interest for diagnostics may be generated without requiring a software update. Further as well, an automatic triggering of changes to CAN message priority is provided so that CAN messages communicating data relating to signals of interest for diagnostics may have an increased preference on the CAN bus without requiring a software update.

With reference to the table 700 of FIG. 7a, the operation status reporting logic 314 of the active logic portion 310 is executable by a processor during a normal operation of a CAN node to determine at one or more selected time rates values of a corresponding one or more operational signals of a first operation such as for example an operation of a cooling fan of the HFCU 230 (FIG. 2), to generate first operation status CAN messages having nominal message priorities and comprising first operation data representative of the values of the one or more operational signals of the cooling fan operation determined at the one or more selected time rates, and to transmit the first operation status CAN messages having the nominal priorities via a CAN transceiver to the CAN bus 150, 210 at the selected time rate. With reference to FIG. 6a, during the normal operation of the CAN node and by way of the particular example of the operation being a cooling fan of the HFCU 230 (FIG. 2), a Fan_Speed signal 710 of the cooling fan operation may be determined at a selected time rate 712 of 1000 ms and reported by CAN messages having the nominal priority of "2" 714, a Fan_Pump_Command signal 720 of the cooling fan operation may be determined at a selected time rate 722 of 20 ms and reported by CAN messages having the nominal priority of "3" 724, and a Fan_State signal 730 of the cooling fan operation may be determined at a selected time rate 732 of 20 ms and reported by CAN messages having the nominal priority of "4" 734.

With reference next to the table 702 of FIG. 7b, the operation diagnostic reporting logic 322 of the latent logic portion 320 is selectively executable by a processor in response to the CAN device 250 receiving a first enhanced diagnostics command message from the CAN bus 250. The operation diagnostic reporting logic 322 is selectively executable by the processor to determine, at a second time rate 790 greater than the selected nominal time rate 712 of the active logic portion 310, one or more selected values of the operational signal of the fan speed operation, generate first operation enhanced status CAN messages comprising first operation enhanced data representative of the values of the first operational signal of the first operation determined at the second time rate, and transmit the first operation enhanced status CAN messages via the CAN transceiver to the CAN bus 250 at the second time rate. In the example embodiment, the transmitting of the first operation enhanced status CAN messages via the CAN transceiver to the CAN bus 250 at the second time rate is in lieu of transmitting the first operation enhanced status CAN messages via the CAN transceiver to the CAN bus 250 at the original selected time rate of the active logic portion 310.

The operation diagnostic reporting logic 322 is further selectively executable by the processor to determine values of a second operational signal of the first operation different than the first operational signal of the first operation, generate second operation status CAN messages comprising second operation data representative of the determined values of the second operational signal of the first operation, and transmit the second operation status CAN messages via the first CAN transceiver to the CAN bus 210.

The operation diagnostic reporting logic 322 is further selectively executable by the processor to determine the values of the first operational signal of the first operation, to generate first signal first operation status prioritized CAN messages having a second message priority higher than the first message priority and comprising the first signal first operation data representative of the values of the first operational signal of the first operation determined at the first time rate, and to transmit the first signal first operation status prioritized CAN messages to the CAN bus at the first time rate in lieu of transmitting the first signal first operation status CAN messages to the CAN bus.

By way of the particular example of the operation being a cooling fan of the HFCU 230 (FIG. 2), the Fan_Speed signal 710 of the cooling fan operation may be determined at a second and increased time rate 790 of 20 ms, the Fan_Pump_Command signal 720 of the cooling fan operation may be determined at the previously selected and unchanged time rate 722 of 20 ms, and the Fan_State signal 730 of the cooling fan operation may be determined at the previously selected time rate 732 of 20 ms.

In addition, the value of a newly added Commanded_Fan_Speed signal 740 of the cooling fan operation may be determined at a selected time rate 742 of 1000 ms by the operation diagnostic reporting logic 322 being selectively executed by the processor in response to receiving the first enhanced diagnostics command message from the CAN bus 250. The determined value of the additional or newly added Commanded_Fan_Speed signal 740 of the cooling fan operation may be transmitted together with the Fan_Speed, Fan_Pump_Command, and Fan_State signals 710, 720, 730 otherwise acquire during the normal operation of the CAN node via the CAN transceiver to the CAN bus 210.

In further addition, the operation diagnostic reporting logic 322 may transmit first signal first operation status prioritized CAN messages via the CAN transceiver to the CAN bus 250 in lieu of transmitting the first signal first operation status CAN messages via the CAN transceiver to the CAN bus 250 at the originally selected nominal priority of the active logic portion 310. By way of the particular example of the operation being a cooling fan of the HFCU 230 (FIG. 2), the Fan_Speed signal 710 of the cooling fan operation may be determined at the enhanced time rate 790 of 20 ms and reported by CAN messages having the nominal priority of "2" 714, the Fan_Pump_Command signal 720 of the cooling fan operation may be determined at the previously selected and unchanged time rate 722 of 20 ms and reported by CAN messages having the increased priority of "0" 792, and the Fan_State signal 730 of the cooling fan operation may be determined at the previously selected and unchanged time rate 732 of 20 ms and reported by CAN messages having the nominal priority of "4" 734.

Figure 8:
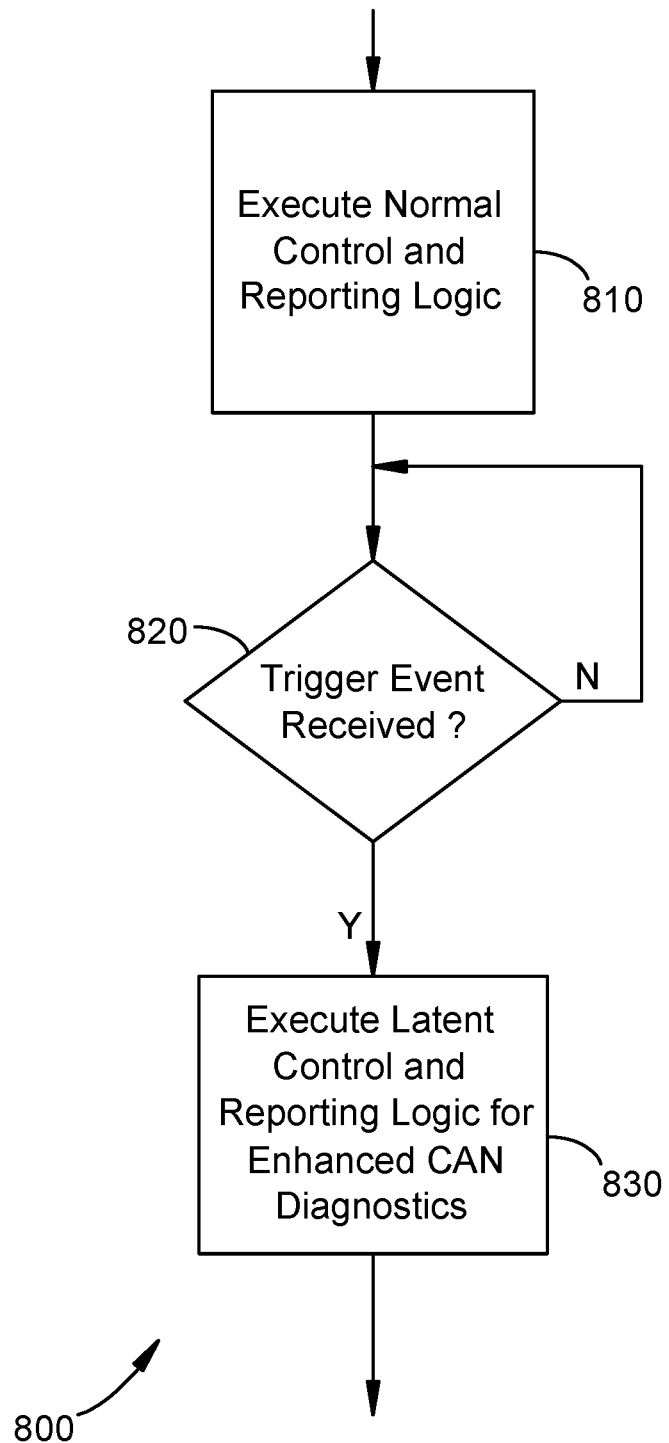
FIG. 8 is a flow diagram illustrating a method of enhanced diagnostic monitoring of operations of an associated work vehicle in accordance with an example embodiment.

FIG. 8 is a flow diagram illustrating a method 800 for providing enhanced diagnostic monitoring of operations of an associated work vehicle in accordance with an example embodiment. Turning now to that Figure, the method 800 includes a first step 810 of executing a normal control and reporting protocol such as described above in connection with the processor executing the active logic portion 310 of the logic 126 during the normal operation of the CAN node to control the operations of the associated work vehicle and to also generate CAN messages for reporting operational signals of the various operations to other CAN controllers in the CAN network 100.

In step 820, it is determined whether a trigger event has occurred and, if not, the system continues to execute the normal control and reporting logic 310 as described above. However, if a trigger event is received by one or more of the CAN controllers, the CAN controller receiving the trigger event begins to execute the operational diagnostic reporting logic 322 which is otherwise latent and unexecuted being merely stored in the memory device of the particular CAN node. In the example embodiment, the latent control and reporting logic 322 for enhanced can diagnostics is executed in lieu of executing the normal control and reporting logic 310 as may be necessary or desired in order to provide and increased frequency of CAN messages, the addition of new CAN messages, a change in the priority of one or more of the CAN messages, or any combination of these. In this way, the embodiment of the example embodiments may provide for enhanced diagnostic monitoring of operations of and associated vehicle without adversely impacting the loading on the CAN bus during normal operations of the associated work vehicle.

In accordance with a further example embodiment, it is contemplated to provide for the system being reactive to the system receiving a further trigger event (not shown) for transitioning the system back to executing the normal active logic portion 310 that is executable during normal operation of the CAN node to control the operations of the associated work vehicle and to generate CAN messages for reporting the operational signals of the various operations to other CAN controllers in the CAN network.

Figure 9:
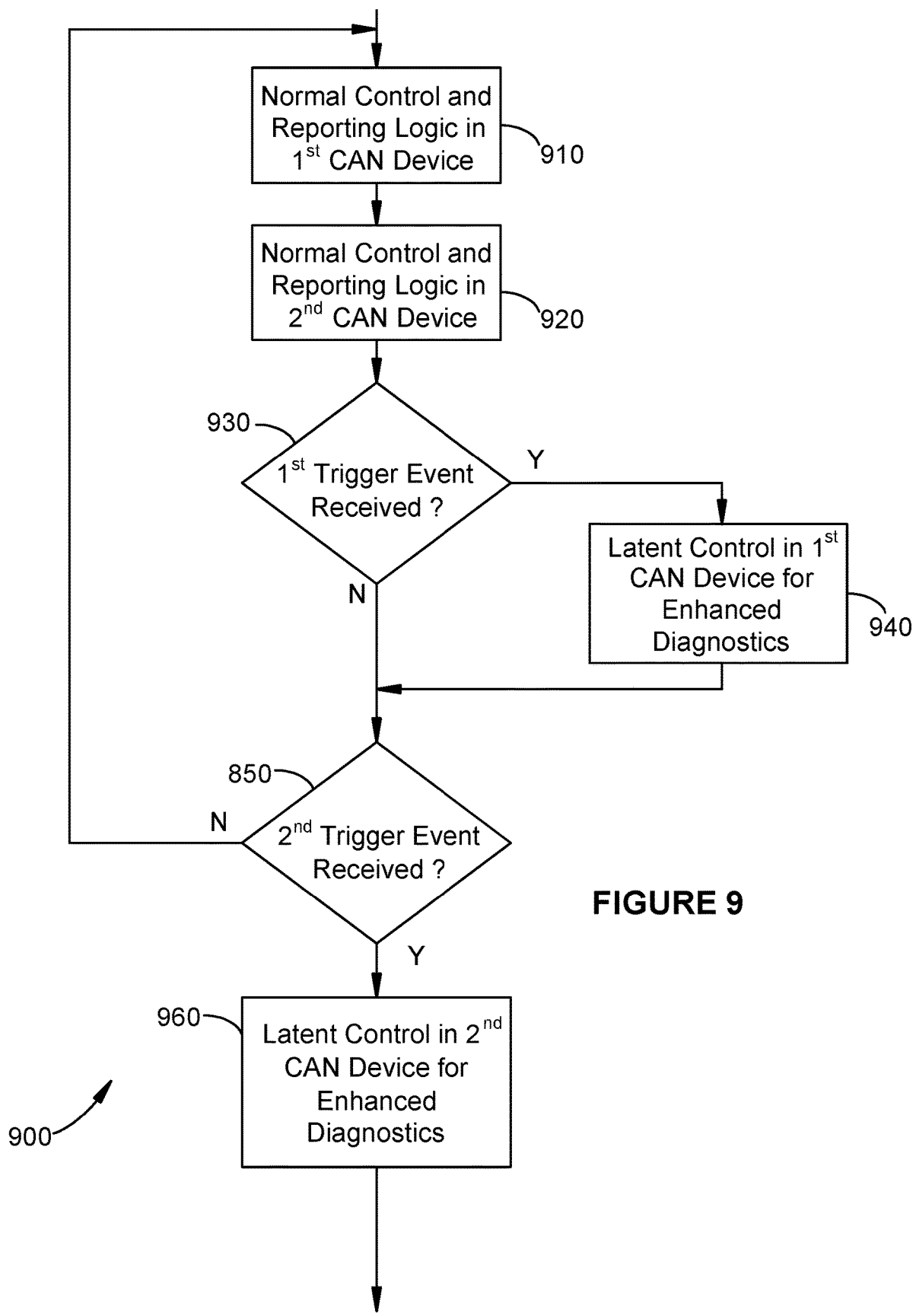
FIG. 9 is a flow diagram illustrating a method of enhanced diagnostic monitoring of operations of an associated work vehicle in accordance with an example embodiment.

FIG. 9 is a flow diagram of a method 900 in accordance with an example embodiment where in both an increase in the frequency of the CAN messages that are generated is provided without requiring software upgrade as well as an automatic triggering of the generation of additional CAN messages as well as triggering changes to message priority in accordance with an example embodiment. The active logic portion 310 is executed in step 910 in a first CAN device. Similarly, an active logic portion 310 is executed in a second CAN device in step 920. In this way, both the first and second CAN devices may execute active logic portions during normal operation of the CAN nodes to control their respective operations of the associated work vehicle and to generate 10 messages for reporting the operational signals of the various operations to other CAN controllers in the CAN network during normal operation of the CAN nodes. At step 930, it is determined whether the first CAN device receives a trigger event and, if so, the first CAN device begins to execute the latent operation diagnostic reporting logic 322 in lieu of executing the active logic portion 310 in order to provide an enhanced diagnostic monitoring of operations of the associated work vehicle under control of the first CAN node.

Similarly, the second CAN device determines at step 950 whether it has received a trigger event and, if so, begins to execute the latent operation diagnostic reporting logic 322 in its memory in order to provide enhanced diagnostic monitoring of operations of the associated work vehicle under control of the second CAN device.

The trigger for executing the otherwise latent operation diagnostic reporting logic 322 may come from various sources in the example embodiments. In accordance with one embodiment, each of the one or more CAN devices may include device decoding logic stored in a memory of the CAN device. The device decoding logic may be executable by a processor in the CAN device to receive a device identification (ID) CAN message from the CAN bus, wherein the device ID CAN message includes device identification (ID) data representative of an identification of an associated further CAN device being coupled with the CAN bus. The device decoding logic is further executable by the processor in the CAN device to determine based on the device (ID) data that the associated further CAN device (not shown) being coupled with the CAN bus such as at the coupler 216 (FIG. 2) is a data logger type device. In accordance with the example embodiment, the first operation diagnostic reporting logic is executable by the first processor to selectively use the device ID CAN message as the first enhanced diagnostics command message based on the device decoding logic determining that the associated further CAN device being coupled with the CAN bus is a data logger type device.

A service plug 228 (FIG. 2) is provided for connection with an associated data logger type device (not shown) for providing diagnostics of the devices 220 on the CAN bus 210. In an example embodiment the associated data logger is sensed when it is connected with the CAN bus 210 by the data logger providing a unique source address, such as 0xFA, for example. By the associated data logger providing the unique source address, such as 0xFA, for example, onto the CAN bus, each of the multiple CAN devices 220 may react in accordance with example embodiments by executing diagnostic logic that is otherwise latent in the devices 220 and not executed under normal operating conditions of the associated work vehicle. In that way, diagnostics may be performed on the CAN bus without the need to update the logic of any of the multiple CAN devices 220. Further, the diagnostics may be performed on the CAN bus without adversely affecting the normal operations of the associated vehicle owing to CAN message latency such as may be caused by the additional CAN diagnostic message traffic.

Figure 10:
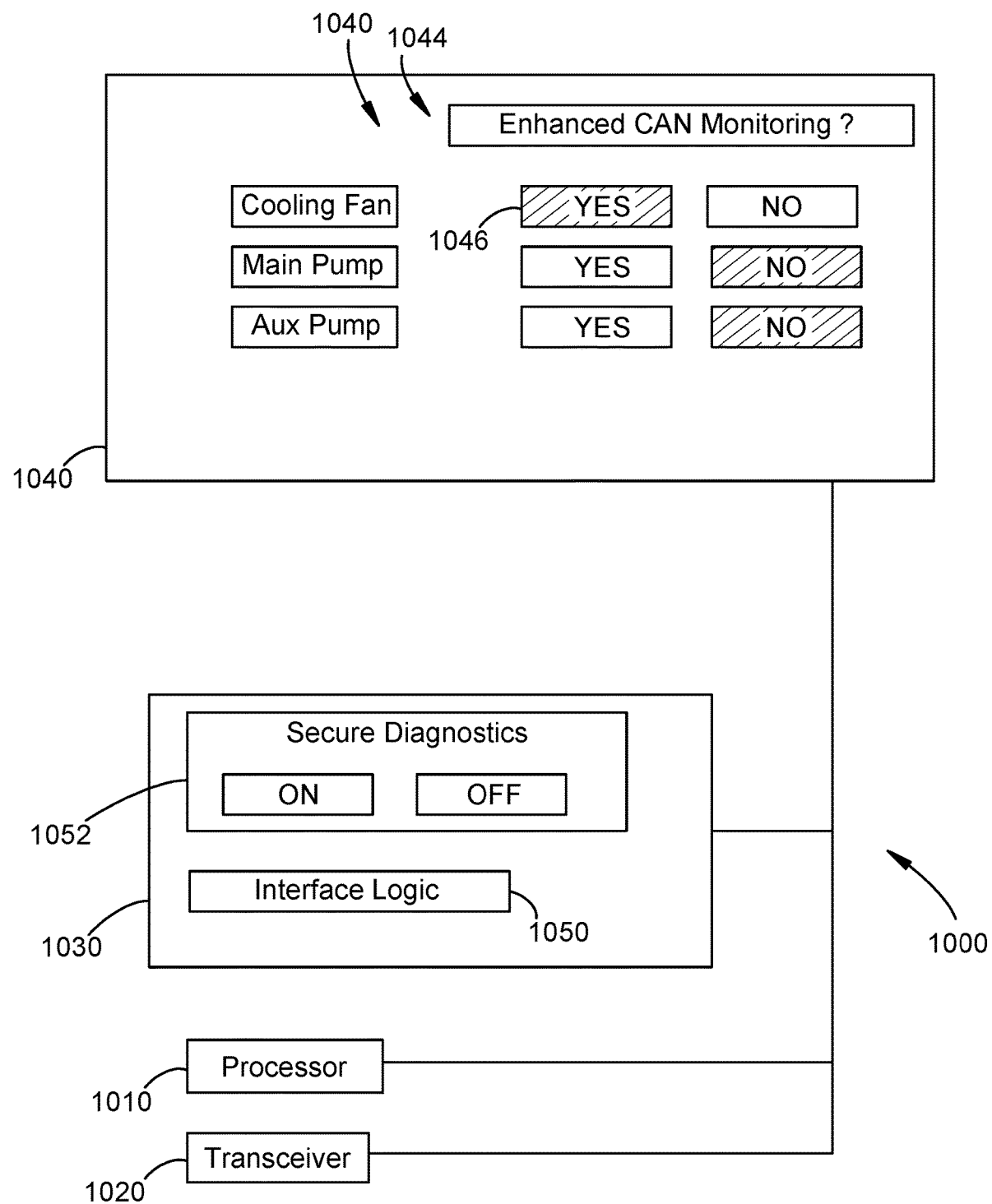
FIG. 10 is a schematic view of an operator interface CAN device that may be used by an operator for controlling enhanced diagnostic monitoring of operations of an associated work vehicle in accordance with an example embodiment.

In accordance with a further embodiment, the trigger for executing the otherwise latent operation diagnostic reporting logic 322 may come from an operator interfacing with a human readable operator interface by selecting options that may be presented on a screen of a display of the operator interface or by the operator providing input via the interface for making changes to selected memory locations in a secure interface level that may only be made available to selected certified and/or qualified technicians or the like. With this in mind attention is directed to FIG. 10 showing an operator interface CAN device 1000 that is operatively coupled with the CAN bus. The operator interface CAN device 1000 of the example embodiment includes a processor 1010, a CAN transceiver 1020 operatively coupling the processor 1010 with the CAN bus 210 (FIG. 2), a memory device 1030, a human readable display 1040, an input 1042 for receiving a selection from a human operator of the operator interface CAN device 1000, and operator interface logic 1050 stored in the memory device 1030.

In accordance with an example embodiment, the operator interface logic 1050 is executable by the processor 1010 to display on the human readable display 1040 indicia of an enhanced diagnostics option 1044 and receive a selection signal from the operator's input. The selection signal may be representative of the selection from the human operator of the indicia 1044 of the enhanced diagnostics option such as for example by the operator selecting the YES option 1046 for enhanced monitoring of the cooling fan of the associate work vehicle. The operator interface logic 1050 is further executable by the processor 1010 to generate the first enhanced diagnostics command message based on receiving the selection signal, and to transmit the first enhanced diagnostics command message via the CAN transceiver 1020 to the CAN bus 210.

In accordance with a further example embodiment, the operator interface logic 1050 is executable by the processor 1010 to display on the human readable display indicia of a current setting of a memory location of the second memory device such as by illuminating the selection icon 1046 or the like, and receive a selection signal from the input, wherein the selection signal is representative of the selection from the human operator of a change from the current setting of the memory location 1052 of the memory device 1030 to an updated setting of the memory location 1052 of the memory device 1030. The operator interface logic 1050 is further executable by the processor 1010 to generate the first enhanced diagnostics command message based on the operator changing the memory location of the second memory device to the updated setting, and to transmit the first enhanced diagnostics command message via the second CAN transceiver 1020 to the CAN bus 210.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A system providing enhanced diagnostic monitoring of operations of an associated work vehicle, the system comprising:
   a Controller Area Network (CAN) bus; and
   a first CAN device controlling a first operation of the associated work vehicle, the first CAN device comprising:
      a first processor;
      a first CAN transceiver operatively coupling the first processor with the CAN bus;
      a first memory device;
      first operation control logic stored in the first memory device, the first operation control logic being executable by the first processor to control the first operation of the associated work vehicle based on a first operation command message received by the first CAN device from the CAN bus via the first CAN transceiver;
      first operation status reporting logic stored in the first memory device, the first operation status reporting logic being executable by the first processor to:
         determine, at a first time rate, values of a first operational signal of the first operation;
         generate first signal first operation status CAN messages having a first message priority and comprising first signal first operation data representative of the values of the first operational signal of the first operation determined at the first time rate; and
         transmit the first signal first operation status CAN messages via the first CAN transceiver to the CAN bus at the first time rate; and
      first operation diagnostic reporting logic stored in the first memory device, the first operation diagnostic reporting logic being selectively executable by the first processor in response to the first CAN device receiving a first enhanced diagnostics command message from the CAN bus to one or more of:
         determine, at a second time rate greater than the first time rate, values of the first operational signal of the first operation; generate first signal first operation enhanced status CAN messages comprising first signal first operation enhanced data representative of the values of the first operational signal of the first operation determined at the second time rate; and transmit the first signal first operation enhanced status CAN messages via the first CAN transceiver to the CAN bus at the second time rate in lieu of transmitting the first signal first operation status CAN messages to the CAN bus at the first time rate; and/or
         determine values of a second operational signal of the first operation different than the first operational signal of the first operation; generate second signal first operation status CAN messages having a specified message priority and comprising second signal first operation data representative of the determined values of the second operational signal of the first operation; and transmit the second signal first operation status CAN messages via the first CAN transceiver to the CAN bus; and/or
         determine, at the first time rate, the values of the first operational signal of the first operation; generate first signal first operation status prioritized CAN messages having a second message priority higher than the first message priority and comprising the first signal first operation data representative of the values of the first operational signal of the first operation determined at the first time rate; and transmit the first signal first operation status prioritized CAN messages to the CAN bus at the first time rate in lieu of transmitting the first signal first operation status CAN messages to the CAN bus at the first time rate.

2. The system according to claim 1, wherein the first operation diagnostic reporting logic is selectively executable by the first processor in response to the first CAN device receiving the first enhanced diagnostics command message from the CAN bus to:
   determine, at the second time rate greater than the first time rate, the values of the first signal first operational signal of the first operation; generate the first signal first operation enhanced status CAN messages having the second message priority higher than the first message priority and comprising the first signal first operation enhanced data representative of the values of the first operational signal of the first operation determined at the second time rate; and transmit the first signal first operation enhanced status CAN messages to the CAN bus at the second time rate in lieu of transmitting the first signal first operation status CAN messages to the CAN bus at the first time rate;
   determine the values of the second operational signal of the first operation different than the first operational signal of the first operation; generate the second signal first operation status CAN messages having the specified message priority wherein the specified message priority is higher than the first message priority and wherein the generated the second signal first operation status CAN messages comprise the second signal first operation data representative of the determined values of the second operational signal of the first operation; and transmit the second signal first operation status CAN messages to the CAN bus; and
   determine, at the first time rate, the values of the first operational signal of the first operation; generate the first signal first operation status prioritized CAN messages having the second message priority higher than the first message priority and comprising the first signal first operation data representative of the values of the first signal of the first operation determined at the first time rate; and transmit the first signal first operation status prioritized CAN messages via the first CAN transceiver to the CAN bus at the first time rate.

3. The system according to claim 1, further comprising:
   an operator interface CAN device operatively coupled with the CAN bus, the operator interface CAN device comprising:
      a second processor;
      a second CAN transceiver operatively coupling the second processor with the CAN bus;
      a second memory device;
      a human readable display;
      an input for receiving a selection from a human operator of the operator interface CAN device; and
      operator interface logic stored in the second memory device, the operator interface logic being executable by the second processor to:
         display on the human readable display indicia of an enhanced diagnostics option;
         receive a selection signal from the input, the selection signal being representative of the selection from the human operator of the indicia of the enhanced diagnostics option;

generate the first enhanced diagnostics command message based on receiving the selection signal; and transmit the first enhanced diagnostics command message via the second CAN transceiver to the CAN bus.

4. The system according to claim 1, wherein the first CAN device further comprises:

device decoding logic stored in the first memory device, the device decoding logic being executable by the first processor to:

receive a device identification (ID) CAN message from the CAN bus via the first CAN transceiver, the device ID CAN message comprising device identification (ID) data representative of an identification of an associated further CAN device being coupled with the CAN bus;

determine based on the device (ID) data that the associated further CAN device being coupled with the CAN bus is a data logger type device; and generate a data logger service message based on determining that the associated further CAN device being coupled with the CAN bus is the data logger type device, wherein the first operation diagnostic reporting logic is executable by the first processor to selectively use the data logger service message as the first enhanced diagnostics command message for selectively executing.

5. The system according to claim 1, further comprising:

an operator interface CAN device operatively coupled with the CAN bus, the operator interface CAN device comprising:

a second processor;

a second CAN transceiver operatively coupling the second processor with the CAN bus;

a second memory device;

a human readable display;

an input for receiving a selection from a human operator of the operator interface CAN device; and operator interface logic stored in the second memory device, the operator interface logic being executable by the second processor to:

display on the human readable display indicia of a current setting of a memory location of the second memory device;

receive a selection signal from the input, the selection signal being representative of the selection from the human operator of a change from the current setting of the memory location of the second memory device to an updated setting of the memory location of the second memory device;

generate the first enhanced diagnostics command message based on the operator changing the memory location of the second memory device to the updated setting; and transmit the first enhanced diagnostics command message via the second CAN transceiver to the CAN bus.

6. The system according to claim 1, wherein the first CAN device comprises:

second operation control logic stored in the first memory device, the second operation control logic being executable by the first processor to control a second operation of the associated work vehicle different than the first operation of the associated work vehicle based on a second operation command message received by the first CAN device from the CAN bus via the first CAN transceiver;

second operation status reporting logic stored in the first memory device, the second operation status reporting logic being executable by the first processor to:

determine, at a third time rate, values of a first operational signal of the second operation;

generate first signal second operation status CAN messages having a third message priority and comprising first signal second operation data representative of the values of the first operational signal of the second operation determined at the third time rate; and transmit the first signal second operation status CAN messages via the first CAN transceiver to the CAN bus at the third time rate; and second operation diagnostic reporting logic stored in the first memory device, the second operation diagnostic reporting logic being selectively executable by the first processor in response to the first CAN device receiving a second enhanced diagnostics command message from the CAN bus to one or more of:

determine, at a fourth time rate greater than the third time rate, values of the first operational signal of the second operation; generate first signal second operation enhanced status CAN messages comprising first signal second operation enhanced data representative of the values of the first operational signal of the second operation determined at the fourth time rate; and transmit the first signal second operation enhanced status CAN messages via the first CAN transceiver to the CAN bus at the fourth time rate in lieu of transmitting the first signal second operation status CAN messages to the CAN bus at the third time rate; and/or determine values of a second operational signal of the second operation different than the first operational signal of the second operation; generate second signal second operation status CAN messages having a specified message priority and comprising second signal second operation data representative of the determined values of the second operational signal of the second operation; and transmit second signal second operation status CAN messages via the first CAN transceiver to the CAN bus; and/or determine, at the third time rate, the values of the first operational signal of the second operation; generate first signal second operation status prioritized CAN messages having a fourth message priority higher than the third message priority and comprising the first signal second operation data representative of the values of the first operational signal of the second operation determined at the third time rate; and transmit the first signal second operation status prioritized CAN messages via the first CAN transceiver to the CAN bus at the third time rate in lieu of transmitting the first signal second operation status CAN messages to the CAN bus at the third time rate.

7. The system according to claim 6, wherein the second operation diagnostic reporting logic is selectively executable by the first processor in response to the first CAN device receiving the second enhanced diagnostics command message from the CAN bus to:

determine, at the fourth time rate greater than the third time rate, the values of the first operational signal of the second operation; generate the first signal second operation enhanced status CAN messages comprising the first signal second operation enhanced data representative of the values of the first operational signal of the second operation determined at the fourth time rate; and transmit the first signal second operation enhanced status CAN messages via the first CAN transceiver to the CAN bus at the fourth time rate in lieu of transmitting the first signal second operation status CAN messages to the CAN bus at the third time rate;

determine the values of the second operational signal of the second operation different than the first operational signal of the second operation; generate the second signal second operation status CAN messages having the specified message priority and comprising the second signal second operation data representative of the determined values of the second operational signal of the second operation; and transmit the second signal second operation status CAN messages via the first CAN transceiver to the CAN bus; and determine, at the third time rate, the values of the first operational signal of the second operation; generate the first signal second operation status prioritized CAN messages having a fourth message priority higher than the third message priority and comprising the first signal second operation data representative of the values of the first operational signal of the second operation determined at the third time rate; and transmit the first signal second operation status prioritized CAN messages via the first CAN transceiver to the CAN bus at the third time rate in lieu of transmitting the first signal second operation status CAN messages to the CAN bus at the third time rate.

8. The system according to claim 1, further comprising:
a second CAN device controlling a second operation of the associated work vehicle different than the first operation of the associated work vehicle, the second CAN device comprising:
a second processor;
a second CAN transceiver operatively coupling the second processor with the CAN bus;
a second memory device;
second operation control logic stored in the second memory device, the second operation control logic being executable by the second processor to control the second operation of the associated work vehicle based on a second operation command message received by the second CAN device from the CAN bus via the second CAN transceiver;
second operation status reporting logic stored in the second memory device, the second operation status reporting logic being executable by the second processor to:
determine, at a third time rate, values of a first operational signal of the second operation;
generate first signal second operation status CAN messages having a third message priority and comprising first signal second operation data representative of the values of the first operational signal of the second operation determined at the third time rate; and
transmit the first signal second operation status CAN messages via the second CAN transceiver to the CAN bus at the third time rate; and
second operation diagnostic reporting logic stored in the second memory device, the second operation diagnostic reporting logic being selectively executable by the second processor in response to the second CAN device receiving a second enhanced diagnostics command message from the CAN bus to one or more of:
determine, at a fourth time rate greater than the third time rate, values of the first operational signal of the second operation; generate first signal second operation enhanced status CAN messages comprising first signal second operation enhanced data representative of the values of the first operational signal of the second operation determined at the fourth time rate; and transmit the first signal second operation enhanced status CAN messages via the second CAN transceiver to the CAN bus at the fourth time rate in lieu of transmitting the first signal second operation status CAN messages to the CAN bus at the third time rate, and/or
determine values of a second operational signal of the second operation different than the first operational signal of the second operation; generate second signal second operation status CAN messages having a specified message priority and comprising second signal second operation data representative of the determined values of the second operational signal of the second operation; and transmit the second signal second operation status CAN messages via the second CAN transceiver to the CAN bus; and/or
determine, at the third time rate, the values of the first operational signal of the second operation; generate first signal second operation status prioritized CAN messages having a fourth message priority higher than the third message priority and comprising the first signal second operation data representative of the values of the first operational signal of the second operation determined at the third time rate; and transmit the first signal second operation status prioritized CAN messages via the second CAN transceiver to the CAN bus at the third time rate in lieu of transmitting the first signal second operation status CAN messages to the CAN bus at the third time rate.

9. The system according to claim 8, wherein the second operation diagnostic reporting logic is selectively executable by the second processor in response to the second CAN device receiving the second enhanced diagnostics command message from the CAN bus to:
determine, at the fourth time rate greater than the third time rate, the values of the first operational signal of the second operation; generate the first signal second operation enhanced status CAN messages comprising the first signal second operation enhanced data representative of the values of the first operational signal of the second operation determined at the fourth time rate; and transmit the first signal second operation enhanced status CAN messages via the second CAN transceiver to the CAN bus at the fourth time rate in lieu of transmitting the first signal second operation status CAN messages to the CAN bus at the third time rate;
determine the values of the second operational signal of the second operation different than the first operational signal of the second operation; generate the second signal second operation status CAN messages having the specified message priority and comprising the second signal second operation data representative of the determined values of the second operational signal of the second operation; and transmit the second signal second operation status CAN messages via the second CAN transceiver to the CAN bus; and determine, at the third time rate, the values of the first operational signal of the second operation; generate the first signal second operation status prioritized CAN messages having the fourth message priority higher than the third message priority and comprising the first signal second operation data representative of the values of the first operational signal of the second operation determined at the third time rate; and transmit the first signal second operation status prioritized CAN messages via the second CAN transceiver to the CAN bus at the third time rate in lieu of transmitting the first signal second operation status CAN messages to the CAN bus at the third time rate.

10. The system according to claim 8, further comprising:

an operator interface CAN device operatively coupled with the CAN bus, the operator interface CAN device comprising:
  a third processor;
  a third CAN transceiver operatively coupling the third processor with the CAN bus;
  a third memory device;
  a human readable display;
  an input for receiving a selection from a human operator of the operator interface CAN device; and
  operator interface logic stored in the third memory device, the operator interface logic being executable by the third processor to:
    display on the human readable display indicia of a first enhanced diagnostics option;
    display on the human readable display indicia of a second enhanced diagnostics option;
    receive a selection signal from the input, the selection signal being representative of the selection from the human operator of the first indicia of the first enhanced diagnostics option or of the selection from the human operator of the first indicia of the first enhanced diagnostics option;
    selectively generate the first enhanced diagnostics command message based on receiving the selection signal representative of the selection from the human operator of the first indicia of the first enhanced diagnostics option;
    selectively generate the second enhanced diagnostics command message based on receiving the selection signal representative of the selection from the human operator of the second indicia of the second enhanced diagnostics option; and
    transmit the first or second enhanced diagnostics command message via the third CAN transceiver to the CAN bus.

11. A method of providing enhanced diagnostic monitoring of operations of an associated work vehicle, the method comprising:

executing first operation control logic stored in a first memory device by a first processor of a first Controller Area Network (CAN) device controlling a first operation of the associated work vehicle to control the first operation of the associated work vehicle based on a first operation command message received by the first CAN device from a CAN bus via a first CAN transceiver of the first CAN device;

executing first operation status reporting logic stored in the first memory device by the first processor to:
  determine, at a first time rate, values of a first operational signal of the first operation;
  generate first signal first operation status CAN messages having a first message priority and comprising first signal first operation data representative of the values of the first operational signal of the first operation determined at the first time rate; and
  transmit the first signal first operation status CAN messages via the first CAN transceiver to the CAN bus at the first time rate; and selectively executing first operation diagnostic reporting logic stored in the first memory device by the first processor in response to the first CAN device receiving a first enhanced diagnostics command message from the CAN bus to one or more of:
  determine, at a second time rate greater than the first time rate, values of the first operational signal of the first operation; generate first signal first operation enhanced status CAN messages comprising first signal first operation enhanced data representative of the values of the first operational signal of the first operation determined at the second time rate; and transmit the first signal first operation enhanced status CAN messages via the first CAN transceiver to the CAN bus at the second time rate in lieu of transmitting the first signal first operation status CAN messages to the CAN bus at the first time rate; and/or
  determine values of a second operational signal of the first operation different than the first operational signal of the first operation; generate second signal first operation status CAN messages having a specified message priority and comprising second signal first operation data representative of the determined values of the second operational signal of the first operation; and transmit the second signal first operation status CAN messages via the first CAN transceiver to the CAN bus; and/or
  determine, at the first time rate, the values of the first operational signal of the first operation; generate first signal first operation status prioritized CAN messages having a second message priority higher than the first message priority and comprising the first signal first operation data representative of the values of the first operational signal of the first operation determined at the first time rate; and transmit the first signal first operation status prioritized CAN messages to the CAN bus at the first time rate in lieu of transmitting the first signal first operation status CAN messages to the CAN bus at the first time rate.

12. The method according to claim 11 comprising:

executing the first operation diagnostic reporting logic by the first processor in response to the first CAN device receiving the first enhanced diagnostics command message from the CAN bus to:
  determine, at the second time rate greater than the first time rate, the values of the first signal first operational signal of the first operation; generate the first signal first operation enhanced status CAN messages having the second message priority higher than the first message priority and comprising the first signal first operation enhanced data representative of the values of the first operational signal of the first operation determined at the second time rate; and transmit the first signal first operation enhanced status CAN messages to the CAN bus at the second time rate in lieu of transmitting the first signal first operation status CAN messages to the CAN bus at the first time rate;

determine the values of the second operational signal of the first operation different than the first operational signal of the first operation; generate the second signal first operation status CAN messages having the specified message priority wherein the specified message priority is higher than the first message priority and wherein the generated the second signal first operation status CAN messages comprise the second signal first operation data representative of the determined values of the second operational signal of the first operation; and transmit the second signal first operation status CAN messages to the CAN bus; and determine, at the first time rate, the values of the first operational signal of the first operation; generate the first signal first operation status prioritized CAN messages having the second message priority higher than the first message priority and comprising the first signal first operation data representative of the values of the first signal of the first operation determined at the first time rate; and transmit the first signal first operation status prioritized CAN messages via the first CAN transceiver to the CAN bus at the first time rate.

13. The method according to claim 11 further comprising:

executing second operation control logic stored in the first memory device by the first processor to control a second operation of the associated work vehicle different than the first operation of the associated work vehicle based on a second operation command message received by the first CAN device from the CAN bus via the first CAN transceiver;

executing second operation status reporting logic stored in the first memory device by the first processor to:

determine, at a third time rate, values of a first operational signal of the second operation;

generate first signal second operation status CAN messages having a third message priority and comprising first signal second operation data representative of the values of the first operational signal of the second operation determined at the third time rate; and transmit the first signal second operation status CAN messages via the first CAN transceiver to the CAN bus at the third time rate; and executing second operation diagnostic reporting logic stored in the first memory device by the first processor in response to the first CAN device receiving a second enhanced diagnostics command message from the CAN bus to one or more of:

determine, at a fourth time rate greater than the third time rate, values of the first operational signal of the second operation; generate first signal second operation enhanced status CAN messages comprising first signal second operation enhanced data representative of the values of the first operational signal of the second operation determined at the fourth time rate; and transmit the first signal second operation enhanced status CAN messages via the first CAN transceiver to the CAN bus at the fourth time rate in lieu of transmitting the first signal second operation status CAN messages to the CAN bus at the third time rate; and/or determine values of a second operational signal of the second operation different than the first operational signal of the second operation; generate second signal second operation status CAN messages having a specified message priority and comprising second signal second operation data representative of the determined values of the second operational signal of the second operation; and transmit second signal second operation status CAN messages via the first CAN transceiver to the CAN bus; and/or determine, at the third time rate, the values of the first operational signal of the second operation; generate first signal second operation status prioritized CAN messages having a fourth message priority higher than the third message priority and comprising the first signal second operation data representative of the values of the first operational signal of the second operation determined at the third time rate; and transmit the first signal second operation status prioritized CAN messages via the first CAN transceiver to the CAN bus at the third time rate in lieu of transmitting the first signal second operation status CAN messages to the CAN bus at the third time rate.

14. The method according to claim 13 comprising:

executing the second operation diagnostic reporting logic by the first processor in response to the first CAN device receiving the second enhanced diagnostics command message from the CAN bus to:

determine, at the fourth time rate greater than the third time rate, the values of the first operational signal of the second operation; generate the first signal second operation enhanced status CAN messages comprising the first signal second operation enhanced data representative of the values of the first operational signal of the second operation determined at the fourth time rate; and transmit the first signal second operation enhanced status CAN messages via the first CAN transceiver to the CAN bus at the fourth time rate in lieu of transmitting the first signal second operation status CAN messages to the CAN bus at the third time rate;

determine the values of the second operational signal of the second operation different than the first operational signal of the second operation; generate the second signal second operation status CAN messages having the specified message priority and comprising the second signal second operation data representative of the determined values of the second operational signal of the second operation; and transmit the second signal second operation status CAN messages via the first CAN transceiver to the CAN bus; and determine, at the third time rate, the values of the first operational signal of the second operation; generate the first signal second operation status prioritized CAN messages having a fourth message priority higher than the third message priority and comprising the first signal second operation data representative of the values of the first operational signal of the second operation determined at the third time rate; and transmit the first signal second operation status prioritized CAN messages via the first CAN transceiver to the CAN bus at the third time rate in lieu of transmitting the first signal second operation status CAN messages to the CAN bus at the third time rate.

15. The method according to claim 11, further comprising:

executing second operation control logic stored in a second memory device by a second processor of a second Controller Area Network (CAN) device controlling a second operation of the associated work vehicle different than the first operation of the associated work vehicle based on a second operation command message received by the second CAN device from a CAN bus via a second CAN transceiver of the second CAN device;

executing second operation status reporting logic stored in the second memory device by the second processor to:
  determine, at a third time rate, values of a first operational signal of the second operation;
  generate first signal second operation status CAN messages having a third message priority and comprising first signal second operation data representative of the values of the first operational signal of the second operation determined at the third time rate; and
  transmit the first signal second operation status CAN messages via the second CAN transceiver to the CAN bus at the third time rate; and executing second operation diagnostic reporting logic stored in the second memory device by the second processor in response to the second CAN device receiving a second enhanced diagnostics command message from the CAN bus to one or more of:
  determine, at a fourth time rate greater than the third time rate, values of the first operational signal of the second operation; generate first signal second operation enhanced status CAN messages comprising first signal second operation enhanced data representative of the values of the first operational signal of the second operation determined at the fourth time rate; and transmit the first signal second operation enhanced status CAN messages via the second CAN transceiver to the CAN bus at the fourth time rate in lieu of transmitting the first signal second operation status CAN messages to the CAN bus at the third time rate, and/or
  determine values of a second operational signal of the second operation different than the first operational signal of the second operation; generate second signal second operation status CAN messages having a specified message priority and comprising second signal second operation data representative of the determined values of the second operational signal of the second operation; and transmit the second signal second operation status CAN messages via the second CAN transceiver to the CAN bus; and/or
  determine, at the third time rate, the values of the first operational signal of the second operation; generate first signal second operation status prioritized CAN messages having a fourth message priority higher than the third message priority and comprising the first signal second operation data representative of the values of the first operational signal of the second operation determined at the third time rate; and transmit the first signal second operation status prioritized CAN messages via the second CAN transceiver to the CAN bus at the third time rate in lieu of transmitting the first signal second operation status CAN messages to the CAN bus at the third time rate.

16. The method according to claim 15 comprising:
executing the second operation diagnostic reporting logic by the second processor in response to the second CAN device receiving the second enhanced diagnostics command message from the CAN bus to:
  determine, at the fourth time rate greater than the third time rate, the values of the first operational signal of the second operation; generate the first signal second operation enhanced status CAN messages comprising the first signal second operation enhanced data representative of the values of the first operational signal of the second operation determined at the fourth time rate; and transmit the first signal second operation enhanced status CAN messages via the second CAN transceiver to the CAN bus at the fourth time rate in lieu of transmitting the first signal second operation status CAN messages to the CAN bus at the third time rate;
  determine the values of the second operational signal of the second operation different than the first operational signal of the second operation; generate the second signal second operation status CAN messages having the specified message priority and comprising the second signal second operation data representative of the determined values of the second operational signal of the second operation; and transmit the second signal second operation status CAN messages via the second CAN transceiver to the CAN bus; and
  determine, at the third time rate, the values of the first operational signal of the second operation; generate the first signal second operation status prioritized CAN messages having the fourth message priority higher than the third message priority and comprising the first signal second operation data representative of the values of the first operational signal of the second operation determined at the third time rate; and transmit the first signal second operation status prioritized CAN messages via the second CAN transceiver to the CAN bus at the third time rate in lieu of transmitting the first signal second operation status CAN messages to the CAN bus at the third time rate.

* * * * *